(12) United States Patent
Vaya et al.

(10) Patent No.: US 10,489,824 B2
(45) Date of Patent: Nov. 26, 2019

(54) METHODS AND SYSTEMS FOR INTERACTION WITH DIGITAL SIGNAGE BOARD

(71) Applicant: CONDUENT BUSINESS SERVICES, LLC, Florham Park, NJ (US)

(72) Inventors: Shailesh Vaya, Bangalore (IN); Aritra Dhar, Konnagar (IN); Bhupendra Singh Solanki, Indore (IN); Atul Singh, Bangalore (IN); Shubhi Sharma, Bangalore (IN); Neeta Pande, Bangalore (IN); Geetha Manjunath, Bangalore (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 779 days.

(21) Appl. No.: 15/077,065

(22) Filed: Mar. 22, 2016

(65) Prior Publication Data

US 2017/0278139 A1    Sep. 28, 2017

(51) Int. Cl.
| G06Q 30/00 | (2012.01) |
| G06Q 30/02 | (2012.01) |
| H04L 29/08 | (2006.01) |
| H04W 4/80 | (2018.01) |

(52) U.S. Cl.
CPC ....... *G06Q 30/0269* (2013.01); *H04L 67/306* (2013.01); *H04W 4/80* (2018.02)

(58) Field of Classification Search
None
See application file for complete search history.

(56) References Cited

U.S. PATENT DOCUMENTS

| 8,781,622 | B2 | 7/2014 | Mockus et al. | |
| 2002/0077896 | A1* | 6/2002 | Liu | G06Q 10/0637 |
| | | | | 705/14.61 |
| 2009/0153765 | A1 | 6/2009 | Yamashita et al. | |
| 2009/0319625 | A1 | 12/2009 | Kouhi | |
| 2011/0016006 | A1 | 1/2011 | Opdycke | |
| 2012/0254347 | A1* | 10/2012 | Seetharam | G06F 17/30029 |
| | | | | 709/217 |
| 2013/0136412 | A1 | 5/2013 | Lee et al. | |
| 2014/0032327 | A1* | 1/2014 | Prakash | G06Q 30/02 |
| | | | | 705/14.64 |
| 2014/0085179 | A1* | 3/2014 | Krig | G06F 3/147 |
| | | | | 345/156 |
| 2014/0114771 | A1 | 4/2014 | Kim et al. | |

(Continued)

*Primary Examiner* — Meredith A Long
(74) *Attorney, Agent, or Firm* — Jones Robb, PLLC

(57) ABSTRACT

A method and a system are provided for interaction with a digital signage board. An electronic device receives, via a transceiver, a first metadata associated with a first grid displayed on the digital signage board that is configured to display a plurality of multimedia content items in a plurality of first cells of the grid. The electronic device receives, via the transceiver, a second metadata associated with the plurality of multimedia content items. The one or more processors in the electronic device display a second grid comprising a plurality of second cells that are based on the first metadata and the second metadata. The one or more processors in the electronic device further update a property associated with at least one of the plurality of second cells based on a user profile stored in the electronic device and the second metadata.

30 Claims, 7 Drawing Sheets

(56) References Cited

U.S. PATENT DOCUMENTS

| | | | | |
|---|---|---|---|---|
| 2015/0006266 A1* | 1/2015 | Huang | ............... | G06Q 30/0241 |
| | | | | 705/14.4 |
| 2015/0084838 A1* | 3/2015 | Chang | ................... | G06F 3/1454 |
| | | | | 345/2.1 |
| 2015/0187186 A1* | 7/2015 | Want | ................... | G06Q 30/0241 |
| | | | | 340/6.1 |
| 2015/0193824 A1* | 7/2015 | Jang | ................... | G06Q 30/0257 |
| | | | | 705/14.55 |
| 2016/0148266 A1* | 5/2016 | Hollar | ............... | G06Q 30/0261 |
| | | | | 705/14.58 |
| 2016/0180709 A1* | 6/2016 | Rider | ................. | G06Q 30/0266 |
| | | | | 340/905 |

* cited by examiner

METHODS AND SYSTEMS FOR INTERACTION WITH DIGITAL SIGNAGE BOARD

TECHNICAL FIELD

The presently disclosed embodiments are related, in general, to interaction systems. More particularly, the presently disclosed embodiments are related to methods and systems for interaction between a digital signage board and electronic devices that are in vicinity of the digital signage board.

BACKGROUND

Digital signage boards are used to display information, such as advertisement, notification, direction, and the like, to a user who is in pre-defined vicinity of the digital signage board. The information displayed on the digital signage board may be programmed to change over time. For example, a digital signage board may be configured to display certain information one day and different information on a different day. In such scenarios, the user may desire to interact with the digital signage board to know in detail about the displayed advertisement of the user's choice.

State-of-the-art interaction systems limit the extent to which the user can interact with the digital signage board. Further, existing interaction systems may not facilitate seamless interaction between the digital signage board and the electronic device as the information displayed on the digital signage board and the information displayed on the electronic device associated with the user may not be user specific.

Further limitations and disadvantages of conventional and traditional approaches will become apparent to a person skilled in the art, through comparison of described systems with some aspects of the present disclosure, as set forth in the remainder of the present application and with reference to the drawings.

SUMMARY

According to embodiments illustrated herein, there may be provided a method to establish interaction between a digital signage board and an electronic device. The method may receive, by a transceiver, a first metadata associated with a first grid displayed on the digital signage board. In an embodiment, the digital signage board is configured to display a plurality of multimedia content items in a plurality of first cells of the first grid. The method may further comprise receiving, by the transceiver, a second metadata associated with the plurality of multimedia content items displayed in the plurality of first cells of the first grid. The method may further comprise displaying, by one or more processors, a second grid including a plurality of second cells on the electronic device. In an embodiment, the second grid is displayed based on the first metadata and the second metadata. The method may further comprise updating, by the one or more processors, a property associated with at least one of the plurality of second cells based on a user profile stored in the electronic device and the second metadata.

According to embodiments illustrated herein, there may be provided a method to operate the digital signage board. The method comprises, in an application server, determining, by one or more processors, a count of a user inputs received corresponding to each multimedia object of a plurality of multimedia objects displayed on the second grid of the electronic device. The method further comprises, determining, by the one or more processors, a plurality of multimedia content items to be displayed on a first grid being displayed on the digital signage board based on the determined count of the user inputs. The method further comprises transmitting, by the one or more processors, the determined plurality of multimedia content items to be displayed on the first grid after a predetermined interval.

According to embodiments illustrated herein, there may be provided an electronic device that may comprise of one or more processors configured to receive a first metadata associated with a first grid displayed on the digital signage board. In an embodiment the one or more processors may be configured to display a plurality of multimedia content items in a plurality of first cells of the first grid. The one or more processors may be further configured to receive a second metadata associated with the plurality of multimedia content items displayed in the plurality of first cells of the first grid. The one or more processors may further be configured to display a second grid comprising a plurality of second cells, based on the first metadata and the second metadata. The one or more processors may further be configured to update a property associated with at least one of the plurality of second cells based on a user profile stored in the electronic device and the second metadata.

According to embodiments illustrated herein, there may be provided an application server that may comprise of one or more processors configured to determine a count of a user inputs received corresponding to each multimedia object of a plurality of multimedia objects displayed on a second grid of an electronic device. The one or more processors may further be configured to determine a plurality of multimedia content items to be displayed on a first grid being displayed on the digital signage board based on the determined count of the user inputs. The one or more processors may further be configured to transmit the determined plurality of multimedia content items to be displayed on the first grid after a predetermined interval.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
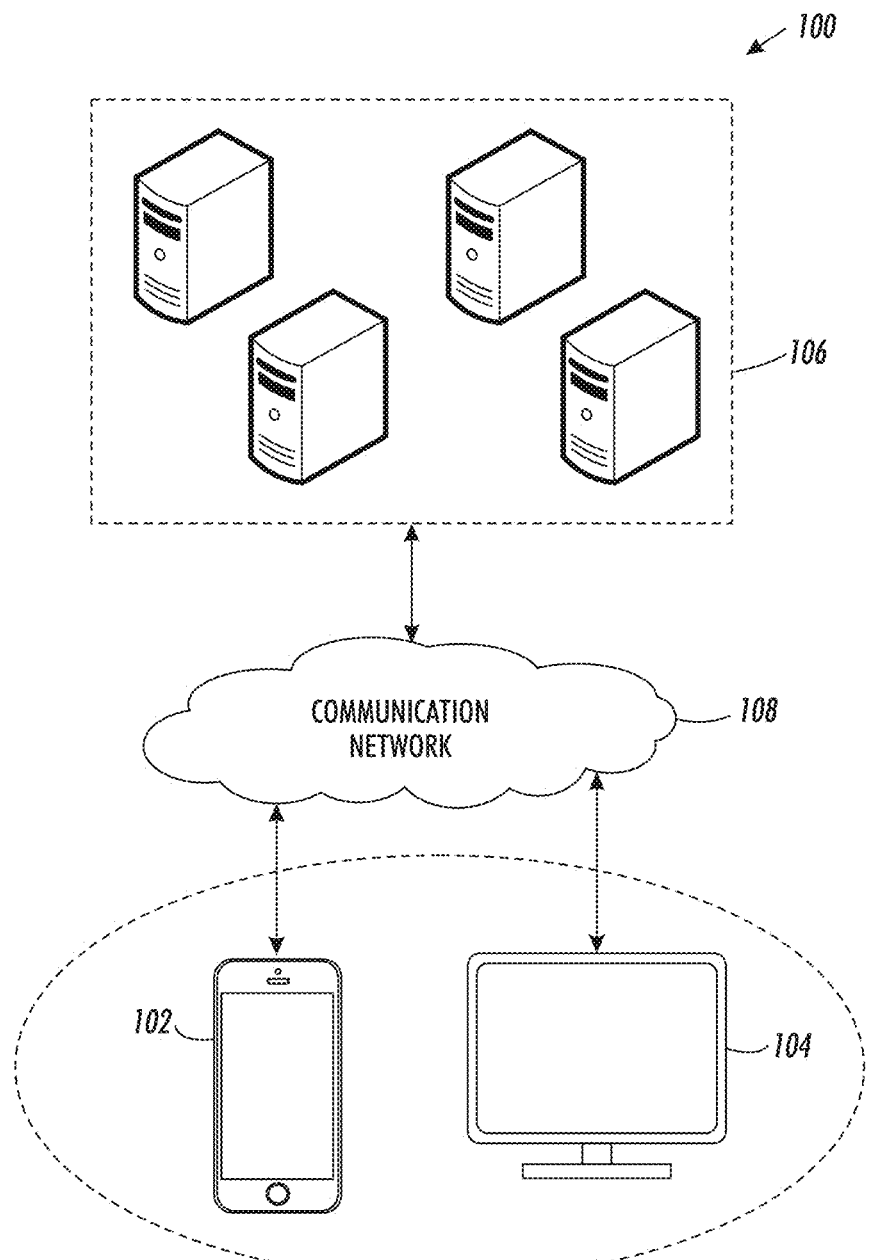
FIG. 1 is a block diagram that illustrates a network environment for interaction with a digital signage board, in accordance with at least one embodiment.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "digital signage board" refers to a display device that is used to display content, such as an advertisement, a notification, a direction, and the like. In an embodiment, the digital signage board is located in a public place, such as a retail store, a stadium, a hotel, a corporate building, and the like. In an embodiment, the digital signage board is utilized to communicate content to a user. In certain scenarios, the digital signage board is used to communicate targeted content to the user in a specific location and at a specific time. In an embodiment, the digital signage board is integrated with an interactive user interface, such as a touch screen that allows the user to interact with the digital signage board.

A "mobile device" refers to a computing device that includes a processor/microcontroller and/or any other electronic component, or a device or a system that performs one or more operations according to one or more programming instructions. In an embodiment, the mobile device is configured to receive content displayed on a digital signage board that is within a pre-defined vicinity of a digital signage board. The mobile device is configured to receive input from a user on the content received from the digital signage board. Examples of the mobile device include, but are not limited to, a personal digital assistant (PDA), a mobile phone, a smart-phone, a tablet computer, and the like.

A "first grid" refers to a user interface, displayed on a display screen of a digital signage board that displays an "m×n" matrix comprising "m" rows and "n" columns. In an embodiment, the first grid is displayed on a digital signage board. The first grid comprises a plurality of regions formed in accordance with the "m×n" matrix. In an embodiment, the plurality of regions of the first grid correspond to a plurality of first cells. In an embodiment, the plurality of first cells may display content, such as an advertisement, a notification, a direction, and the like. In an embodiment, a shape of each of the plurality of first cells is different. In an embodiment, the shape corresponds to, but is not limited to, a rectangular shape, a circular shape, and an oblong shape. In an embodiment, the first grid may be configured to display a plurality of multimedia content items. In an embodiment, each first cell of the plurality of first cells is associated with an index.

A "second grid" refers to a user interface, displayed on a display screen of an electronic device that may be created based on the second metadata that is received from the application server. The second metadata is received based on a selection of a first cell of the first grid displayed on the display screen of the electronic device. The second grid may comprise a plurality of multimedia objects through which the user may retrieve one or more details about an advertised product that corresponds to the selected first cell of the first grid. In an embodiment, each second cell of the plurality of second cells has a same index as that of the corresponding first cell of the plurality of first cells displayed on the digital signage board.

A "first metadata" refers to a count of number of rows and columns of the first grid displayed on the digital signage board. The first metadata may further refer to a first content displayed in the first grid on the digital signage board. In an embodiment, the first content may correspond to advertisements of one or more products. The first metadata may further comprise a location of the digital signage board, a product ID associated with one or more products, names of the one or more products, categories of the one or more products, a timestamp associated with the first content displayed on the digital signage board, an external URL associated with the one or more products, and/or one or more rules associated with each of the advertisements of the one or more products.

A "second metadata" refers to information associated with each of a plurality of multimedia content items displayed in a plurality of first cells of a first grid on the digital signage board. In an embodiment, the second metadata comprises a plurality of multimedia objects corresponding to the plurality of multimedia content items. The plurality of multimedia objects contain information such as product information associated with each of the plurality of multimedia content items. In an embodiment, the plurality of multimedia objects are displayed in the form of text message, an audio message, or a video message. In an embodiment, each of the plurality of multimedia objects are displayed in each of the plurality of second cells in the second grid on the electronic device. In an embodiment, a multimedia object of the plurality of multimedia objects, displayed in the second cell, corresponds to a multimedia content item of the plurality of multimedia content items, displayed in a first cell of the plurality of first cells.

A "plurality of multimedia content items" refers to content displayed within each of a plurality of first cells in a first grid displayed on a digital signage board. Examples of the plurality of multimedia content items may include, but are not limited to, a thumbnail, or a graphical representation of content displayed on the digital signage board.

A "user profile" comprises information about a user, such as an age, a gender, a job status, a purchase history, and/or a shopping list. In an embodiment, the user profile is stored on an electronic device of the user. The user profile is updated based on one or more preferences of the user.

A "first cell in the first grid" represents location of the first cell among the plurality of the first cells displayed on a digital signage board. In an embodiment, the location of the first cell on the digital signage board is defined using Cartesian coordinates which provide a unique reference point.

A "second cell in the second grid" represents location of the second cell amongst the plurality of the second cells displayed on an electronic device. In an embodiment, the location of the second cell on the electronic device is defined using Cartesian coordinates which provides a unique reference point.

A "set of rules" refers to one or more rules that may be deterministic of user's interest in each multimedia content item of the plurality of multimedia content items displayed in the first grid on the digital signage board. The set of rules may refer to one or more instructions that may be transmitted to an electronic device, to update the property of a multimedia object of the plurality of multimedia objects displayed in the first grid, at the electronic device. The set of rules may be compared with one or more parameters of the stored user profile XML, based on which the one or more grids of the first grid may be highlighted.

An "advertisement" may correspond to a message or information that may be communicated to a user. The advertisement comprises information about one or more products or services. The advertisement is communicated to the user using a communication media, such as an audio, a video, a billboard, a television, a radio, a digital signage board, and the like.

FIG. 1 is a block diagram that illustrates a network environment for interaction with a digital signage board in accordance with at least one embodiment. The system environment 100 includes an electronic device 102, a digital signage board 104, a server 106, and a communication network 108. Further, the pre-defined vicinity of the digital signage board 104 is depicted using the numeral 110. Various devices in the system environment 100 may be interconnected over a communication network 108. FIG. 1 shows, for simplicity, one electronic device 102, and one digital signage board 104. However, it will be apparent to a person having ordinary skill in the art that the disclosed embodiments may also be implemented using multiple electronic devices and multiple digital signage boards without departing from the scope of the disclosure. FIG. 1 shows, multiple servers 104. However, it will be apparent to a person having ordinary skill in the art that the disclosed embodiments may also be implemented using a single server without departing from the scope of the disclosure.

The electronic device 102 may refer to a computing device that may receive targeted content based on a first metadata and second metadata. The electronic device 102 may comprise one or more processors in communication with one or more memories. The one or more memories may include computer readable code that is executable by the one or more processors to perform one or more predetermined operations. The electronic device 102 may comprise one or more sensors, such as an image sensor, an RFID sensor, or an NFC sensor. For example, a machine-readable code displayed on the digital signage board 104 may be captured by the electronic device 102 using one or more sensors. The electronic device 102 may capture the machine-readable code using a communication channel. The examples of communication channel may include, but are not limited to, a Near Field Communication (NFC), a Bluetooth, a Wi-Fi network, or a Bluetooth Low Energy (BLE). Examples of the electronic device 102 may include, but are not limited to, a personal computer, a laptop, a personal digital assistant (PDA), a mobile device, a smartphone, a tablet, or any other computing device.

The digital signage board 104 may refer to a display device that is used to display content, such as an advertisement, a notification, a direction, and the like. The digital signage board 104 may include one or more processors in communication with one or more memories. The one or more memories may include computer readable code that is executable by the one or more processors to perform one or more predetermined operations. The digital signage board 104 may be configured to display a machine-readable code. The machine-readable code may contain a first metadata that corresponds to a first content displayed on the digital signage board 104. In an embodiment, the first content may correspond to advertisements of one or more products.

In an embodiment, the server 106 refers to a computing device or a software framework hosting an application or a software service. In an embodiment, the server 106 is implemented to execute procedures such as, but not limited to, programs, routines, or scripts stored in one or more memories for supporting the hosted application or the software service. In an embodiment, the hosted application or the software service is configured to perform one or more predetermined operations. The server 106 is realized through various types of application servers such as, but not limited to, a Java application server, a .NET framework application server, a Base4 application server, a PHP framework application server, or any other application server framework. Examples of server 106 may include, but not limited to, a relational database server, a SAP server, PeopleSoft® server, a Siebel server, and the like.

The server 106 may be configured to store a first metadata and a second metadata. The first metadata and the second metadata may be stored in a memory of the server 106. In an embodiment, the first metadata may correspond to a count of number of rows and columns displayed on a digital signage board 104. The first metadata may further comprise a location of the digital signage board 104, a product ID associated with one or more products, names of the one or more products, categories of the one or more products, a timestamp associated with the first content displayed on the digital signage board 104, an external URL associated with the one or more products, and/or one or more rules associated with each of the advertisements of the one or more products. The server may be further configured to store a map data of a store. The map data comprises first information pertaining to the location of one or more digital signage boards in the store, and the one or more product categories associated with the one or more products in vicinity of each of the one or more digital signage boards. The second metadata may correspond to one or more product categories associated with one or more products that may be determined based on the map data.

In an embodiment, the server 106 may create one or more campaigns that may be scheduled to be displayed as the first content on the digital signage board 104. The server 106 may select a campaign from the one or more campaigns that may be relevant to the user (not shown) based on the one or more rules. Further, based on the selected campaign, the server 106 may transmit targeted content to the electronic device 102 associated with a user. In an embodiment, the server 106 may store a set of instructions, codes, programs, algorithms, and/or the like, which may be extracted by the electronic device 102 to execute the one or more predetermined operations.

The communication network 108 may include a medium through which devices, such as the mobile device 102, the digital signage board 104 and one or more servers, such as the backend server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
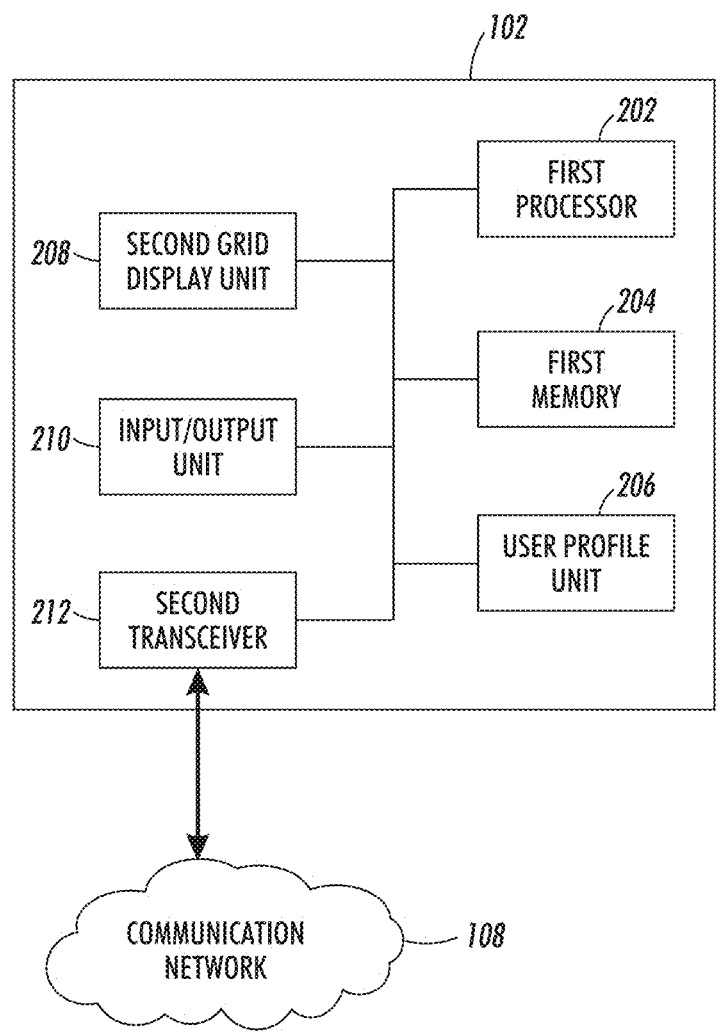
FIG. 2 is a block diagram that illustrates one or more components of an electronic device that is utilized for interaction with a digital signage board, in accordance with at least one embodiment.

FIG. 2 is a block diagram that illustrates one or more components of the electronic device 102 that is utilized for interaction with the digital signage board 104, in accordance with at least one embodiment. FIG. 2 is explained in conjunction with elements from FIG. 1. In an embodiment, the electronic device 102 includes a first processor 202, a first memory 204, a user profile unit 206, a first grid display unit 208, an input/output (I/O) unit 210, and a first transceiver 212. The first processor 202 may be communicatively connected to the first memory 204, the user profile unit 206, the first grid display unit 208, the I/O unit 210, and the first transceiver 212. The first transceiver 212 may be communicatively coupled to the communication network 108.

The first processor 202 comprises suitable logic, circuitry, interfaces, and/or code that may be configured to execute a set of instructions stored in the first memory 204. The first processor 202 may be implemented based on a number of processor technologies known in the art. The first processor 202 works in conjunction with the user profile unit 208 and the first grid display unit 208 to retrieve the first metadata and/or the second metadata corresponding to a digital signage board, from the server 106, via the first transceiver 212. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The first memory 204 comprises suitable logic, circuitry, interfaces, and/or code that may be configured to store the set of instructions, which are executed by the first processor 202. In an embodiment, the first memory 204 may be configured to store one or more programs, routines, or scripts that are executed by the first processor 202 in conjunction with the user profile unit 208 and the first grid display unit 208. The first memory 204 may be implemented based on a Random Access Memory (RAM), a Read-Only Memory (ROM), a Hard Disk Drive (HDD), Solid State Drive (SSD), a storage server, and/or a Secure Digital (SD) card.

The user profile unit 206 comprises suitable logic, circuitry, interfaces, and/or code that may be configured to determine one or more parameters associated with a user. Such one or more parameters may comprise an age, a gender, a job status, a purchase history, a shopping list, and/or one or more preferences of the user. The user profile unit 206 may be further configured to store the determined one or more parameters in the first memory 204. In an embodiment, the user profile unit 206 may be developed using one or more programming languages such as, C, C++, COBOL, Java, and/or the like. In another embodiment, the user profile unit 206 may be implemented as an Application-Specific Integrated Circuit (ASIC) microchip designed for a special application, such as determining the one or more foregoing parameters and communicating the one or more parameters to the first processor 202 or the server 106, via the communication network 108. In an embodiment, one or more user preferences of a user may be determined by the user profile unit 206 based on the first metadata and the second metadata.

The second grid display unit 208 comprises suitable logic, circuitry, interfaces, and/or code that may be configured to receive a first metadata and a second metadata corresponding to the digital signage board 104, via the first transceiver 212 from the server 106. The second grid display unit 208 may be configured to generate a second grid that comprises a plurality of second cells. In an embodiment, the index of each of the plurality of the second cells may correspond to the index of each of the plurality of the first cells in the first grid displayed on the digital signage board 104. The grid display unit 208 may be further configured to associate a multimedia content item with each of the plurality of second cells. The second grid display unit 208 may be configured such that each of the plurality of second cells may display the plurality of multimedia objects. In an embodiment, the second grid display unit 208 may be implemented based on one or more programming languages such as, C, C++, COBOL, Java, and/or the like. In another embodiment, the second grid display unit 208 may be implemented as an Application-Specific Integrated Circuit (ASIC) microchip designed for the foregoing applications.

The input/output (I/O) unit 210 comprises suitable logic, circuitry, interfaces, and/or code that may be configured to receive an input or provide an output to a user. In an embodiment, the user may correspond to a shopper surveying a store comprising one or more digital signage boards, in search of one or more products that are on sale. The I/O unit 210 comprises various input and output devices that may be configured to communicate with the first processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The first transceiver 212 comprises suitable logic, circuitry, interfaces, and/or code that may be configured to receive the first metadata and/or the second metadata from the server 106, via the communication network 108. The first transceiver 212 implements one or more known technologies to support wired or wireless communication with the communication network 108. In an embodiment, the first transceiver 212 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The first transceiver 212 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In an implementation scenario, consider a store that has a plurality of digital signage boards located in a plurality of locations of the store. In an embodiment, each location of the digital signage board may be categorized into a section of a store. For example, digital signage board 1 may be located in the electronics section of the store. Similarly, digital signage board 2 may be located in the grocery section of the store. In an embodiment, a pre-defined vicinity may be associated with each digital signage board. When the electronic device 102 associated with a user is within the pre-defined vicinity 110 of the digital signage board 104, the interaction may be possible.

When the user enters the store and is within the pre-defined vicinity of the one or more digital signage boards from the plurality of digital signage boards, the first processor 202 may be configured to receive one or more identifications of the one or more digital signage boards, via the communication network 108. In an embodiment, the identification may comprise a numeral, an alphanumeric value, an alphabet, a key, and/or the like. In an embodiment, the identification may be utilized to uniquely identify each of the one or more digital signage boards present in the store. In an embodiment, the one or more digital signage boards may display a plurality of multimedia content items that are displayed on a display screen of the digital signage board 104 in a first grid. In an embodiment, the first grid refers to a user interface, displayed on a display screen of the digital signage board 104 that displays an "m×n" matrix comprising "m" rows and "n" columns. The first grid comprises a plurality of regions formed in accordance with the "m×n" matrix. In an embodiment, the plurality of regions of the first grid correspond to a plurality of first cells. In an embodiment, the plurality of first cells may display content, such as an advertisement, a notification, a direction, and the like. In an embodiment, a shape of each of the plurality of first cells is different. In an embodiment, the shape corresponds to, but is not limited to, a rectangular shape, a circular shape, and an oblong shape. In an embodiment, the first grid may be configured to display the plurality of multimedia content items. In an embodiment, each first cell of the plurality of first cells is associated with an index.

In an embodiment, the electronic device 102 may be within the pre-defined vicinity of the one or more digital signage boards. Thus, the second grid display unit 208 may be configured to receive the identification information from each of the one or more digital signage boards via the communication network 108. Based on the received identification information the second grid display unit 208, may be configured to generate a list of the one or more digital signage boards. Based on the generated list, the input/output unit 210 may be configured to display the list of the one or more digital signage boards and the associated identification information on the display screen of the electronic device 102. After displaying the list of the one or more digital signage boards, the user of the electronic device 102 may provide one or more user inputs for selection of a digital signage board from the list, such as the digital signage board 104, for establishing the communicative connection with the server 106. In an embodiment, the user input may correspond to a touch based input, a voice input, a freeform gesture, and/or the like.

In an embodiment, based on the received identification and the input, the first processor 202 may be configured to automatically establish a communicative connection with the server 106. In an alternate embodiment, if only one digital signage board is within the vicinity of the electronic device 102, the communicative connection with the server 106 may be established automatically based on the identification information of the digital signage board. During the establishment of the communicative connection, the first processor 202 may be configured to transmit an identification of the electronic device 102 to the server 106. Further, the identification information of the digital signage board that the user has selected based on the input may be transmitted to the server 106.

In an embodiment, based on the established communicative connection between the electronic device 102 and the server 106, the second grid display unit 208 may be configured to receive a first metadata from the server 106 via the first transceiver 212. In an embodiment, the first metadata may correspond to the plurality of multimedia content items displayed in the first grid shown on the digital signage board 104. In an embodiment, the first metadata may comprise a count of the rows and columns of the first grid. In an embodiment, the first metadata may further comprise a set of rules associated with each multimedia object of the plurality of multimedia objects. The set of rules may be deterministic of user's interest (user preferences) in each multimedia content items of the plurality of multimedia content items displayed in the first grid on the digital signage board 104. In an embodiment, the first processor 202 may be configured to store the received first set of metadata in the first memory 204.

Further, the second grid display unit 208 may be configured to receive a second metadata associated with the plurality of multimedia content items displayed in the plurality of first cells of the first grid from the server 106 via the first transceiver 212. In an embodiment, the second metadata refers to information associated with each of a plurality of multimedia content items displayed in the plurality of first cells of the first grid on the digital signage board 104. In an embodiment, the second metadata comprises the plurality of multimedia objects corresponding to the plurality of multimedia content items. The plurality of multimedia objects contain information such as product information associated with each of the plurality of multimedia content items. In an embodiment, the plurality of multimedia objects are displayed in the form of a text message, an audio message, or a video message. In an embodiment, each of the plurality of multimedia objects are displayed in each of the plurality of second cells in the second grid on the electronic device. In an embodiment, a multimedia object of the plurality of multimedia objects, displayed in the second cell, corresponds to a multimedia content item of the plurality of multimedia content items, displayed in a first cell of the plurality of first cells.

Based on the received first metadata and the second metadata, the second grid display unit 208 may be configured to create a second grid comprising a plurality of second cells. In an embodiment, the second grid may be created such that it is a representative of the first grid on the electronic device 102. Further, the index of each second cell in the second grid and the corresponding first cell in the first grid is the same. In an embodiment, the second grid display unit 208 may be configured to create a replica of the first grid on the display screen of the electronic device 102 based on the received first metadata and the second metadata. In an embodiment, based on the received plurality of multimedia objects in the second metadata, the grid display unit 208 may be configured to create the second grid comprising the plurality of second cells. The first processor 202 may be configured to display the second grid on the display screen of the electronic device 102. In an embodiment, each of the plurality of multimedia objects displayed in the second cell of the second grid is associated with a corresponding multimedia object in the first cell of the first grid. For example, a multimedia object displayed in the second cell of the second grid at a display screen location "(i, j)" will correspond to the multimedia object displayed in the first cell of the first grid at a display screen location "(i, j)".

After creation of the second grid, the second grid display unit 208 may be configured to display the second grid comprising the plurality of second cells on the display screen of the electronic device 102. In an embodiment, the size of the second grid is determined based on the count of rows and the count of columns of the first grid that is received from the second metadata. Further, the plurality of multimedia objects are displayed in the second grid. In an embodiment, each multimedia object of the plurality of multimedia objects is displayed in a second cell of the plurality of second cells of the second grid. In an embodiment, the multimedia object displayed in the second cell may correspond to a multimedia in a first content item of the plurality of multimedia content items displayed in the plurality of first cells. In an embodiment, an index of the second cell in the second grid is same as an index of the first cell in the first grid.

In an embodiment, the second grid display unit 208 may be configured to receive one or more instructions from the user profile unit 206. The received one or more instructions may correspond to highlighting the one or more multimedia content items displayed in the plurality of second cells in the second grid based on the user profile data and the second metadata. The user profile unit 206 may be configured to identify one or more multimedia objects from the plurality of multimedia objects based on the set of rules (stored in the first metadata) associated with each multimedia object of the plurality of multimedia objects and the stored user profile. Based on the identification of the one or more multimedia objects and the received one or more instructions, the second grid display unit 208 may be further configured to highlight the one or more multimedia content items of the displayed plurality of multimedia content items. Thus, in an embodiment, the plurality of multimedia content items displayed in the second grid may be updated based on the user profile data stored in the first memory 204 of the electronic device 204. In an embodiment, the user profile may comprise information about a user, such as an age, a gender, a job status, a purchase history, and/or a shopping list. In an embodiment, the user profile may be generated by the user profile unit 206. In an embodiment, the user profile unit 206 may be configured to update the user profile based on one or more preferences of the user.

In an embodiment, the second grid display unit 208 may be configured to update the plurality of multimedia objects being displayed in the plurality of second cells based on changes in the display of the plurality of multimedia content items in the plurality of first cells. For example, based on changing the property of the plurality of first cells of the first grid, the display of the second grid may be updated accordingly. In an embodiment, the property may comprise a brightness level, a color scheme, a contrast level, a font size of the plurality of multimedia objects present in the plurality of first cell, and/or one or more other visual or audio properties known in the art. Notwithstanding, the disclosure may not be so limited, and the highlighting of the one or more multimedia content items of the displayed plurality of multimedia content items may be based on instructions generated by the first processor 202 based on the set of rules and the user profile, without departing from the scope of the disclosure.

In another embodiment, the second grid display unit 208 may be configured to update the plurality of multimedia objects being displayed in the plurality of second cells based on changes in the display of the plurality of multimedia content items in the plurality of first cells. For example, when a color scheme of a multimedia object displayed in the first cell of the first grid is changed, the color scheme of the multimedia object displayed in the corresponding second cell of the second grid will also be changed to communicate an information to the user of the electronic device 102. The information may correspond to a sale that may be on offer on a product advertised by the multimedia objects of the first grid and the second grid.

After displaying the second grid on the display screen of the electronic device 102, the I/O unit 210 may be configured to receive an input to select a second cell from the plurality of second cells in the second grid. In an embodiment, the user input may correspond to a touch based input, a voice input, a freeform gesture, and/or the like. In an embodiment, based on the user input, the first processor 202 may be configured to transmit the user input to the server 106, via the first transceiver 212. In an embodiment, the input provided by the user may correspond to a request to purchase one or more products advertised by the displayed multimedia objects of the second cell of the second grid, and/or a request to retrieve one or more other details associated with such a product. In response to the provided input, the first processor 202 may be further configured to receive second metadata that corresponds to the selected multimedia content item displayed in the second cell of the second grid, via the transceiver 212. The second metadata may comprise the plurality of multimedia objects corresponding to the selected multimedia content item. In an embodiment, such a plurality of multimedia objects may comprise an audio associated with the selected multimedia content item, a video, an animation, a graphic, a universal resource locator (URL) of another multimedia content item, one or more product details associated with a product advertised by selected multimedia content item, and/or one or more purchase options associated with a product advertised by selected multimedia content item. A person of ordinary skill in the art will appreciate that the second metadata may comprise a plurality of other details associated with the selected multimedia content item, without limiting the scope of the disclosure. In an embodiment, the grid display unit 208 may be further configured to generate another grid to list the one or more products selected based on the user inputs that are received corresponding to the displayed one or more multimedia objects in the second cells of the second grid. The I/O unit 210 may be configured to receive one or more other user inputs that correspond to a confirmation of selection of the selected products. In an embodiment, the first processor 202 may be configured to transmit the confirmation to the server 106, via the transceiver 212 to complete the transaction of purchase of the selected products.

A person skilled in the art will understand that the example method of interaction with the one or more digital signage boards, the server 106 and the electronic device 102, has been provided for illustrative purposes and should not be construed to limit the scope of the disclosure.

Figure 3:
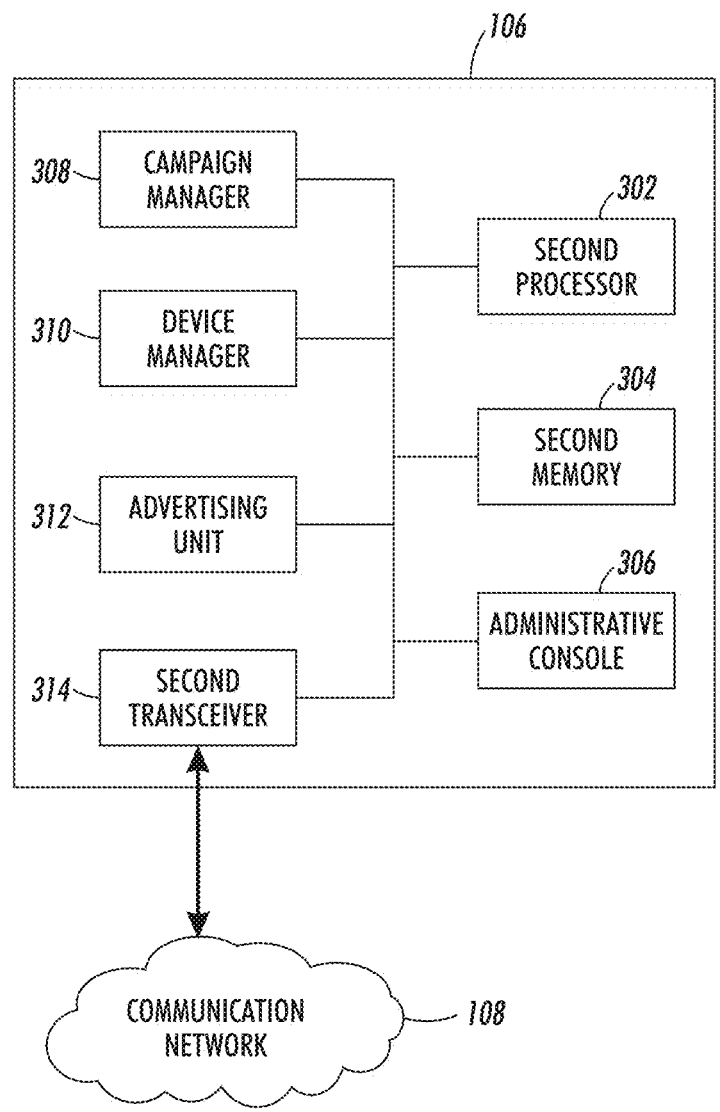
FIG. 3 is a block diagram that illustrates one or more components of a server for interaction with a digital signage board and an electronic device, in accordance with at least one embodiment.

FIG. 3 is a block diagram that illustrates one or more components of a server 106 for interaction with the digital signage board 104 and the electronic device 102, in accordance with at least one embodiment. FIG. 3 is explained in conjunction with elements from FIG. 1 and FIG. 2. In an embodiment, the server 106 includes a second processor 302, a second memory 304, an administrative console 306, a campaign manager 308, a device manager 310, an advertising unit 312, and a second transceiver 314. The second processor 302 may be communicatively connected to the second memory 304, the administrative console 306, the campaign manager 308, the device manager 310, the advertising unit 312, and the second transceiver 314. The second transceiver 316 may be communicatively coupled to the communication network 108.

The second processor 302 comprises suitable logic, circuitry, interfaces, and/or code that may be configured to execute a set of instructions stored in the second memory 304. The second processor 302 may be implemented based on a number of processor technologies known in the art. The second processor 302 works in conjunction with the administrative console 306, the campaign manager 308, the device manager 310, and/or the advertising unit 312 to determine a count of user inputs received corresponding to a multimedia content item displayed on a digital signage board. The second processor 302 may be further configured to generate advertisement campaigns based on the determined count of user inputs. The second processor 302 may accordingly transmit a determined plurality of multimedia content items to be displayed on a digital signage board. Examples of the second processor 302 include, but are not limited to, an X86-based processor, a Reduced Instruction Set Computing (RISC) processor, an Application-Specific Integrated Circuit (ASIC) processor, a Complex Instruction Set Computing (CISC) processor, and/or other processor.

The second memory 304 comprises suitable logic, circuitry, interfaces, and/or code that may be configured to store the set of instructions, which are executed by the second processor 302. In an embodiment, the second memory 304 may be configured to store one or more programs, routines, or scripts that are executed by the second processor 302. The second memory 304 may be implemented based on a Random Access Memory (RAM), a Read-Only Memory (ROM), a Hard Disk Drive (HDD), Solid State Drive (SSD), a storage server, and/or a Secure Digital (SD) card.

The administrative console 306 comprises suitable logic, circuitry, interfaces, and/or code that may be configured to provide a means for configuring one or more parameters of the server 106. Such one or more parameters may comprise a count of the one or more digital signage boards that may be associated with the server 106, an identification of the one or more associated digital signage boards, a maximum count of the one or more electronic devices that may be associated with a digital signage board of the one or more associated digital signage boards. In an embodiment, the administrative console 306 may be developed using one or more programming languages such as, C, C++, COBOL, Java, and/or the like. In another embodiment, the administrative console 306 may be implemented as an Application-Specific Integrated Circuit (ASIC) microchip designed for a special application, such as determining the one or more foregoing parameters and communicating the one or more parameters to the second processor 302 or the server 106, via the communication network 108.

The campaign manager 308 comprises suitable logic, circuitry, interfaces, and/or code that may be configured to compile the data that is based on the set of rules stored in the second memory 304 and/or the count of user inputs received corresponding to the plurality of multimedia objects displayed on the one or more digital signage boards. The campaign manager 308 may be further configured to transmit the compiled data to one or more other components of the server 106, such as the second processor 302, and the advertising unit 312. The campaign manager 308 may be implemented based on one or more programming languages such as, C, C++, COBOL, Java, and/or the like. In another embodiment, the campaign manager 308 may be implemented as an Application-Specific Integrated Circuit (ASIC) microchip designed for the foregoing applications.

The device manager 310 comprises suitable logic, circuitry, interfaces, and/or code that may be configured to track and/or control the operation of the one or more digital signage boards associated with the server 106. The device manager 310 may track and/or control the one or more digital signage boards based on an identification of each of the one or more digital signage boards. In an embodiment, the device manager 310 may be configured to change one or more display parameters of the associated one or more digital signage boards. The device manager 310 may be implemented based on one or more programming languages such as, C, C++, COBOL, Java, and/or the like. In another embodiment, the device manager 310 may be implemented as an Application-Specific Integrated Circuit (ASIC) microchip designed for the foregoing applications.

The advertising unit 312 comprises suitable logic, circuitry, interfaces, and/or code that may be configured determine one or more properties associated with the plurality of multimedia objects associated with the first grid and/or the second grid. The determination of the one or more properties may be based on the data compiled by the campaign manager 308. The advertising unit 312 may be configured to alter the one or more properties associated with the plurality of multimedia objects displayed on the associated one or more digital signage boards associated with the one or more digital signage boards. The advertising unit 312 may be implemented based on one or more programming languages such as, C, C++, COBOL, Java, and/or the like. In another embodiment, the device manager 310 may be implemented as an Application-Specific Integrated Circuit (ASIC) microchip designed for the foregoing applications.

The second transceiver 314 comprises suitable logic, circuitry, interfaces, and/or code that may be configured to receive the identifications of the one or more digital signage boards that may be associated with the server 106. The second transceiver 314 may be further configured to receive one or more user inputs from the one or more users associated with the electronic devices corresponding to the one or more digital signage boards, via the communication network 108. The user inputs may correspond to a request for a first metadata and/or a second metadata associated with the plurality of multimedia objects displayed on the associated one or more digital signage boards. The second transceiver 314 may be implemented based on one or more known technologies to support wired or wireless communication with the communication network 108. In an embodiment, the second transceiver 314 includes, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The second transceiver 314 communicates via wireless communication with networks, such as the Internet, an Intranet and/or a wireless network, such as a cellular telephone network, a wireless local area network (LAN) and/or a metropolitan area network (MAN). The wireless communication uses any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the second processor 302 of the server 106 may be configured to register one or more digital signage boards. The registration of the one or more digital signage boards may be performed by the device manager 310 of the server 106 based on the administrative console 306. In an embodiment, an administrator may register the one or more digital signage boards, such as a digital signage board "$SB_x$", with the device manager 310, based on an identification "x" associated with the digital signage board. In an embodiment, the device manager 310 may be configured to store the registration information of each of the registered one or more digital signage boards in the second memory 304.

In an embodiment, each of the display screen of the registered digital signage boards may be divided into a plurality of first cells that constitute the first grid. The first grid may comprise "m" rows and "n" columns to create an "m×n" first grid comprising the plurality of first cells. Each of the cells of the plurality of first cells may correspond to an advertisement. The mapping of the location of the first cell and a corresponding advertisement may be maintained by the advertising unit 312, and may be stored in the second memory 304. In an embodiment, the advertising unit 312 may be further configured to assign a timestamp to the advertisements associated with the first cell. Such timestamp may also be tracked and stored in the memory 304. The cumulative information stored by the second memory may be in accordance with the equation (1):

$$SB_x(i,j) [t_p, t_q] = ad_r \quad (1)$$

where,

"$SB_x$" represents a digital signage board having identification "x",

"i" represents the row number of the grid,

"j" represents the column number of the grid,

"$t_p$" represents a starting timestamp of display of the advertisement "$ad_r$" by the first grid "(i, j)", "$t_q$" represents an ending timestamp of display of the advertisement "$ad_r$" by the first grid "(i, j)".

In an embodiment, the advertising unit 312 may be configured to maintain a list of the advertisements that may be displayed in the first grid of the digital signage board 104. The advertising unit 312 may be further configured to store the list in the second memory 304. In an embodiment, the advertising unit 312 may be configured to display an advertisement in each of the plurality of first cells of the first grid.

The advertisement may be displayed based on use of a plurality of multimedia content items. Each of the plurality of multimedia content items may comprise a plurality of multimedia objects. In an embodiment, the selection of advertisement and the plurality of multimedia content items may be performed by the campaign manager 308. The campaign manager 308 may be configured to select the advertisement based on one or more algorithms stored in the second memory 304. Such one or more algorithms may be based on a tracking of user responses corresponding to the advertisements displayed on the digital signage boards.

In an embodiment, for each advertisement in the stored list of advertisements, the campaign manager 308 may be configured to determine a count of user inputs received corresponding to each multimedia object of the plurality of multimedia objects displayed on the second grid of the electronic device 102. Such a count of hits indicate an interest level among the users vis-à-vis the displayed advertisements in the first grid of the digital signage board 104. The campaign manager 308 may be further configured to periodically transmit the list of advertisements and the updated count of hits per advertisement for each advertisement in the list, to the second processor 302. In an embodiment, such a period may be one hour. The second processor 302 may be configured to determine a threshold value of count of hits per advertisement based on a count of number of electronic devices 102 present in the pre-defined vicinity of the digital signage boards. In an embodiment, the campaign manager 308 may be configured to determine a duration for which an advertisement from the list of advertisements will be displayed, based on the determined threshold value of count of hits per advertisement. The campaign manager 308 may be further configured to communicate the determined duration and the list of advertisements to be displayed on the digital signage boards, to the advertising unit 312. The advertising unit 312 may be configured to assign a cell corresponding to the grids of the digital signage boards to the advertisements present in the received list of advertisements. In an embodiment, the grids displayed on the digital signage boards may correspond to first grid.

In an embodiment, when the electronic device 102 is detected within the pre-defined vicinity 110 of a digital signage board, such as the digital signage board 104, a communicative connection may be established between the server 106 and the electronic device 102. In an embodiment, a request for establishing the communicative connection may be received by the second processor 302, based on an automatic selection of strongest signal received from a digital signage board from the one or more digital signage boards whose pre-defined vicinity is breached by the electronic device 102. In another embodiment, the request for establishing the communicative connection may be received by the second processor 302, based on a manual selection of a digital signage board by the user of the electronic device 102. The received request for establishing the communicative connection may comprise an identification of the electronic device 102 of the user, an identification of the user, and/or the identification of the digital signage board. The second processor 302 may be configured to establish the communicative connection between the electronic device 102 and server 106, based on the identification information of the selected digital signage board. Further, the second processor 302 may be configured to store the details of the established communicative connection in the second memory 304.

In an embodiment, based on the established communicative connection, the second processor 302 may be configured to retrieve the first metadata from the second memory 304. The second processor 302 may be further configured to transmit the first metadata to the electronic device 102, via the transceiver 314. In an embodiment, the first metadata may correspond to the plurality of multimedia content items displayed in the first grid of the digital signage boards, such as the digital signage board 104. Based on the received first metadata, the electronic device 102 may render the plurality of multimedia content items of the first grid to the user on the display screen of the electronic device 102. In an embodiment, the first metadata may further comprise a set of rules associated with each multimedia object of the plurality of multimedia objects. The set of rules may be deterministic of user's interest in each multimedia content items of the plurality of multimedia content items displayed in the first grid on the digital signage board 104. The set of rules may further correspond to one or more instructions that may be transmitted to the electronic device 102, to update the property of a multimedia object of the plurality of multimedia objects displayed in the second grid, at the electronic device 102. For example, according to the set of rules, when the gender of the user is "female", one or more multimedia objects that correspond to advertised products in the first grid, such as female footwear, corresponding with "female" gender may be highlighted at the electronic device 102.

In certain scenarios, the electronic device 102 may not transmit the user profile XML to the server 106 due to privacy concerns. In such scenarios, the second processor 302 may be configured to transmit the aforementioned set of rules along with the first metadata. At the electronic device 102, the set of rules may be compared with one or more parameters of the stored user profile XML. Consequently, one or more second cells of the first grid may be highlighted based on the comparison. In an instance, it may be determined that the user corresponds to a particular age category, such as a "child". Further, based on the set of rules, it may be defined that when the user corresponds to a particular age category, such as a "child" (age of the user is less than a predetermined age threshold), one or more multimedia objects that correspond to advertised products in the first grid, such electronic games, may be highlighted. Consequently, based on the comparison of the age of the user determined from the stored user profile XML and the transmitted set of rules, one or more grids that correspond to advertised products in the first grid, such "electronic games", may be highlighted.

In an embodiment, the electronic device 102 may be configured to receive one or more user inputs to select a multimedia content item displayed in a second cell of the second grid. The received one or more user inputs may be received by the second processor 302, via the second transceiver 314. The received one or more user inputs may correspond to a touch based input, a voice input, a freeform gesture, and/or the like. Based on the reception of the user input, the second processor 302 may be further configured to retrieve the second metadata from the second memory 304. The second metadata may correspond to the selected multimedia content item displayed in a first cell of the first grid. The second metadata may comprise the plurality of multimedia objects corresponding to the selected multimedia content item. In an embodiment, such a plurality of multimedia objects may comprise an audio associated with the selected multimedia content item, a video, an animation, a graphic, a universal resource locator (URL) of another multimedia content item, one or more product details associated with a product advertised by selected multimedia content item, and/or one or more purchase options associated with a product advertised by selected multimedia content item. A person of ordinary skill in the art will appreciate that the second metadata may comprise a plurality of other details associated with the selected multimedia content item, without limiting the scope of the disclosure. The second metadata may be transmitted to the electronic device 102, via the second transceiver 314.

In an embodiment, based on the received plurality of multimedia objects in the second metadata, the electronic device 102 may generate the second grid comprising the plurality of second cells that may be displayed on the display screen of the electronic device 102. In an embodiment, each of the plurality of multimedia object displayed in the second cell of the second grid is associated with a corresponding to multimedia object in the first cell of the first grid, as explained in FIG. 2.

In an embodiment, the server 106 may be configured to determine the plurality of multimedia content items to be displayed on the first grid being displayed on the digital signage board based on the determined count of the user inputs. Further, the server 106 may be configured to transmit the determined plurality of multimedia content items to be displayed on the first grid after a predetermined interval. For example, the server 104 may determine that the user's in the store are interested in electronic items based on the count of the user inputs. Thus, the server 106 may be configured to determine the multimedia content items related to electronic items. Further, such data may be transmitted to the digital signage board. In an embodiment, the server 106 may be configured to update the property of a first cell from the plurality of cells based on the determined count. For example, the size of the cell that displays the electronic items may be increased.

A person skilled in the art will understand that the example method of facilitating interaction with the one or more digital signage boards by use of the server 106, has been provided for illustrative purposes and should not be construed to limit the scope of the disclosure.

Figure 4A:
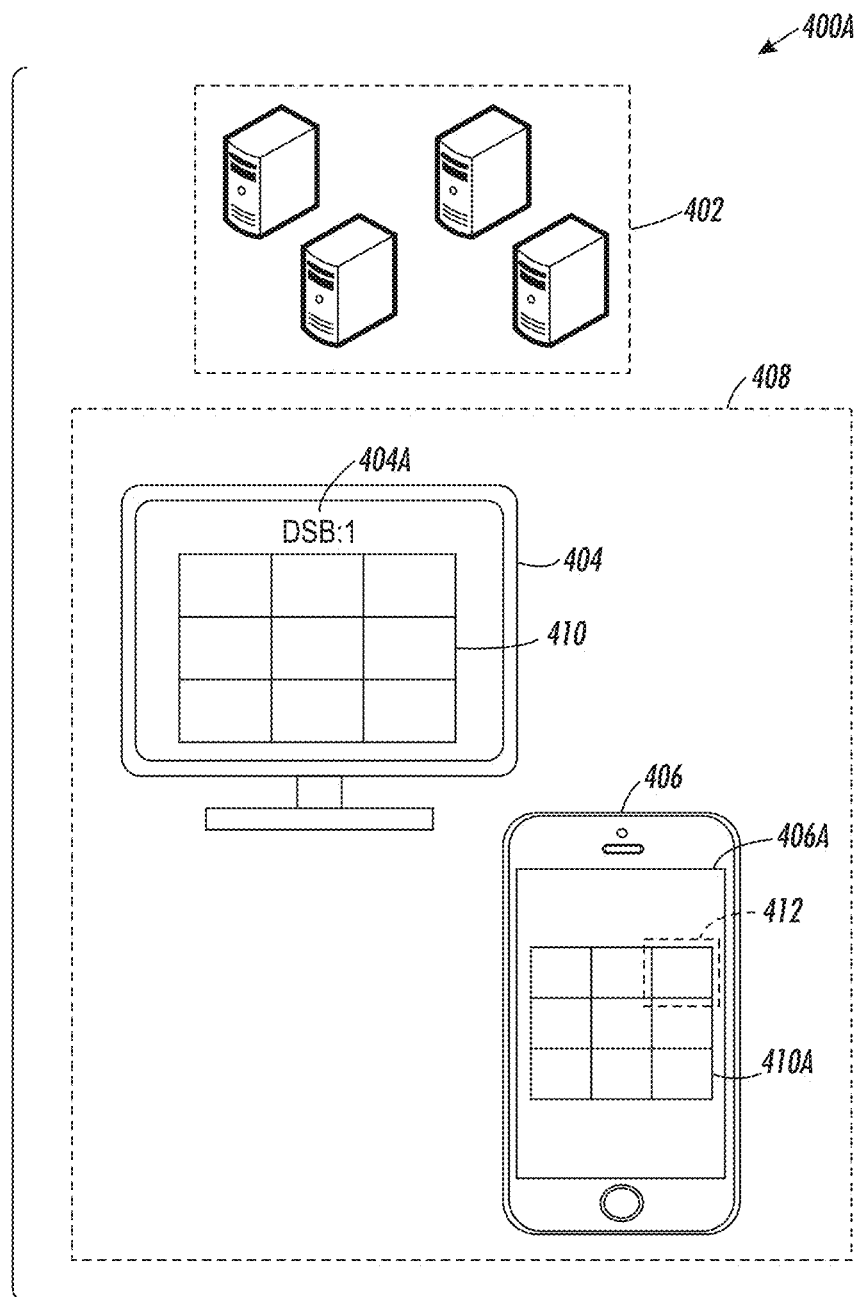
FIGS. 4A, 4B, and 4C are exemplary scenarios that illustrate a method for interaction with a digital signage board, in accordance with at least one embodiment.
Figure 4B:
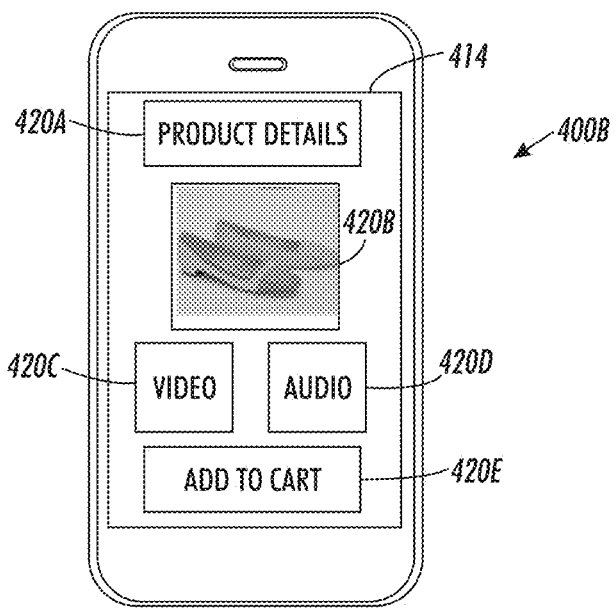
Figure 4C:
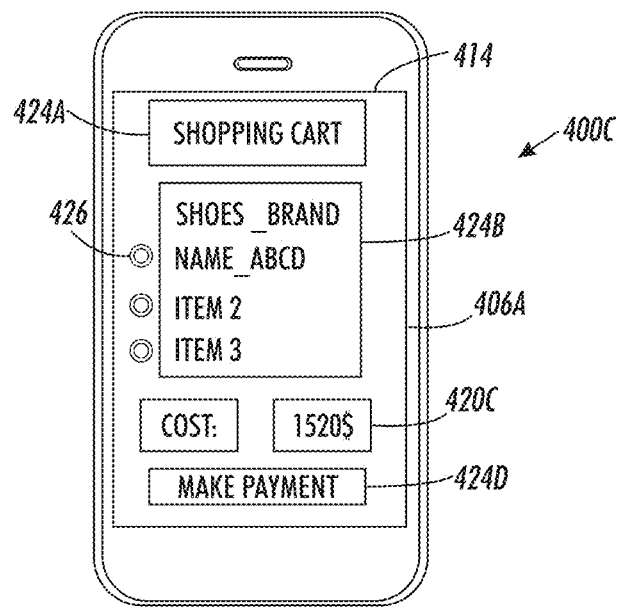

FIGS. 4A, 4B, and 4C are exemplary scenarios that illustrate a method for interaction with a digital signage board, in accordance with at least one embodiment. FIGS. 4A, 4B, and 4C have been described in conjunction with FIG. 1, FIG. 2, and FIG. 3.

With reference to FIG. 4A, there is shown an exemplary scenario 400a comprising a server 402, a digital signage board 404, and an electronic device 406. The server 402 may correspond to the server 106, the digital signage board 404 may correspond to the digital signage board 104, and the electronic device 406 may correspond to the electronic device 102, as discussed in FIGS. 1-3. Further, the digital signage board may be associated with the server 404 via the communication network 108. The pre-defined vicinity of the digital signage board has been depicted by 408.

In an exemplary scenario, the digital signage board 404 may comprise an identification denoted by 404a. The identification may correspond to a physical notation that may be placed on top of the digital signage board 404, so that it is visible to a user associated with the electronic device 406. The display screen of the digital signage board 404 may be divided into "3" rows and "3" columns, to create a first grid 410 of size "3×3".

In an instance, when the electronic device 406 is detected within the pre-defined vicinity 408 of the digital signage board 404, the display screen 406a of the electronic device 406 may be configured to notify the user to connect to the digital signage board 404. In another exemplary scenario, when the electronic device 406 is detected within the pre-defined vicinity of a plurality of digital signage boards, the display screen 406a of the electronic device 406 may be configured to display a list of the plurality of digital signage boards for connecting.

In an instance, the electronic device 406 may be configured to receive a user input for selection or confirmation of a selection of the digital signage board 404 to establish a communicative connection. In an instance, based on the established communicative connection, the identification of the digital signage board 404 and the electronic device 406 may be transmitted to the server 402. Further, the electronic device 406 may be configured to display the identification 404a, such as "DSB: 1", of the digital signage board on the display screen 406a of the electronic device 406.

The server 402 may be further configured to transmit the first metadata based on which the second grid 410a may be rendered on the display screen 406a of the electronic device 406. In an instance, based on the set of rules associated with the plurality of multimedia content items displayed in the second grid 410a, and the information of the user profile, the electronic device 406 may be configured to update the property of the one or more second cells, such as the second cell 412, of the first grid 410 displayed on the electronic device 406. The detailed illustration of updating of the property of the one or more second cells of the second grid based on the information associated with the user profile has been provided in the FIG. 2.

With reference to FIG. 4B, there is shown an exemplary scenario 400b depicting the first user interface 410 and a second user interface 414 that may be rendered on the display screen of the electronic device 406. The second user interface 414 may be based on the second metadata that may be received from the server 402 based on a user input. The user input may correspond to a selection of a second cell 412 comprising a multimedia content item of the second grid 410a. Such a selected multimedia content in the cell 412 may correspond to a product advertised by the multimedia content item.

In an exemplary scenario, the second user interface 414 may further comprise one or more other user interface objects, such as 420a, 420b, 420c, 420d, and/or 420e. The user interface object 420a may comprise a string, such as "Product Details". The user interface object 420b may correspond to one or more images that may include, but are not limited to, one or more product details, such as a discount offered on the product, a barcode associated with the product, a QR code associated with the product, a URL corresponding to one or more other details associated with the product. The user interface object 420c may correspond to an option to retrieve a video associated with the product. The user interface object 420d may correspond to an option to retrieve an audio associated with the product. The user interface object 420e may correspond to an option to add the product to a virtual shopping cart of the user to initiate a purchase transaction associated with the product. The aforementioned details associated with the product may be retrieved from the server 402.

With reference to FIG. 4C, there is shown an exemplary scenario 400c depicting a third user interface (denoted by 414 in FIG. 4C) that may be rendered on the display screen 406a of the electronic device 406. The third user interface 414 may be based on the addition of the one or more products to the virtual shopping cart of the user. The one or more products may be added to the shopping cart based on the user input received from the user corresponding to the one or more instances of the second cells 412 of the second grid 410a.

In an exemplary scenario, the third user interface 414 may further comprise one or more other user interface objects, such as 424a, 424b, 420c, and/or 424d. The user interface object 424a may comprise a string such as "Shopping Cart Details." The user interface object 424b may correspond to one or more selected products. Each of the selected products 424b may further be associated with a radio button such as the radio button 426 to enable the user to finalize the list of selected products to be bought. The user interface object (denoted by 420c in FIG. 4C) may correspond to a cost of the purchase transaction that may be updated in real-time based on a selection or a de-selection input received from the user (by use of the radio buttons 426), corresponding to the one or more selected products depicted by the user interface object 424b. The user interface object 424d may correspond to an option to make a payment corresponding to the finalized one or more products.

Figure 5:
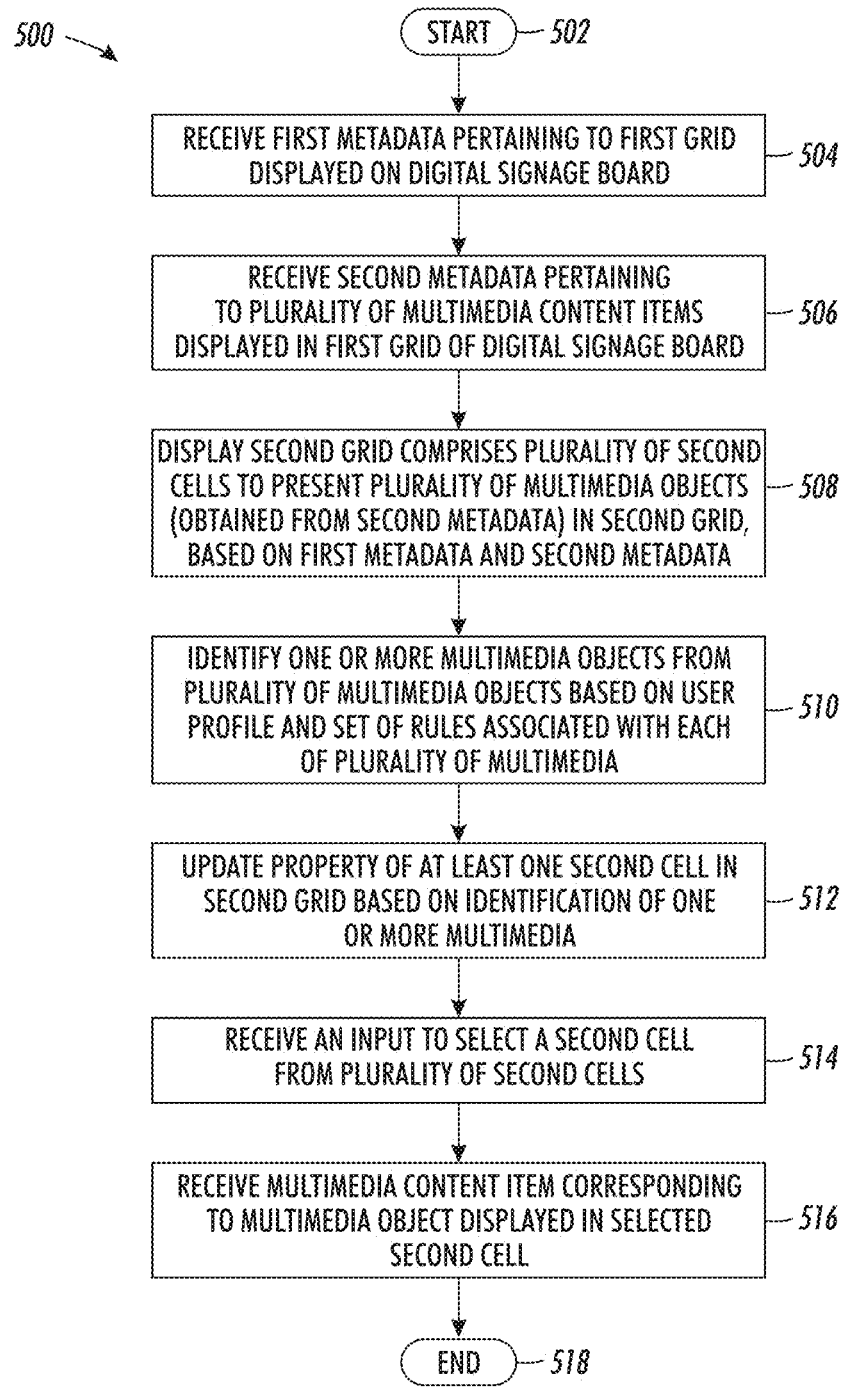
FIG. 5 is a flowchart that illustrates a first method for interaction by the electronic device 102, in accordance with at least one embodiment.

FIG. 5 is a flowchart illustrating a first method for interaction by the electronic device 102, in accordance with at least one embodiment. With respect to FIG. 5, there is shown a first flowchart 500 that has been described in conjunction with FIGS. 1-3. The flowchart begins at step 502 and proceeds to step 504.

At step 504, the electronic device 102 may be configured to receive the first metadata pertaining to the first grid displayed on the digital signage board. At step 506, the electronic device 102 may be configured to receive the second metadata pertaining to the plurality of multimedia content items displayed in the first grid of the digital signage board. At step 508, the electronic device 102 may be configured to display second grid that comprises the plurality of second cells to present the plurality of multimedia objects (obtained from second metadata) in the second grid, based on the first metadata and second metadata. At step 510, the electronic device 102 may be configured to identify one or more multimedia objects from the plurality of multimedia objects based on the user profile and the set of rules associated with each of the plurality of multimedia objects. At step 512, the electronic device 102 may be configured to update the property of at least one second cell in the second grid based on identification of the one or more multimedia objects. At step 514, the electronic device 102 may be configured to receive an input to select a second cell from the plurality of second cells. At step 516, the electronic device 102 may be configured to receive the multimedia content item corresponding to the multimedia object displayed in the selected second cell. Control passes to end step 518.

Figure 6:
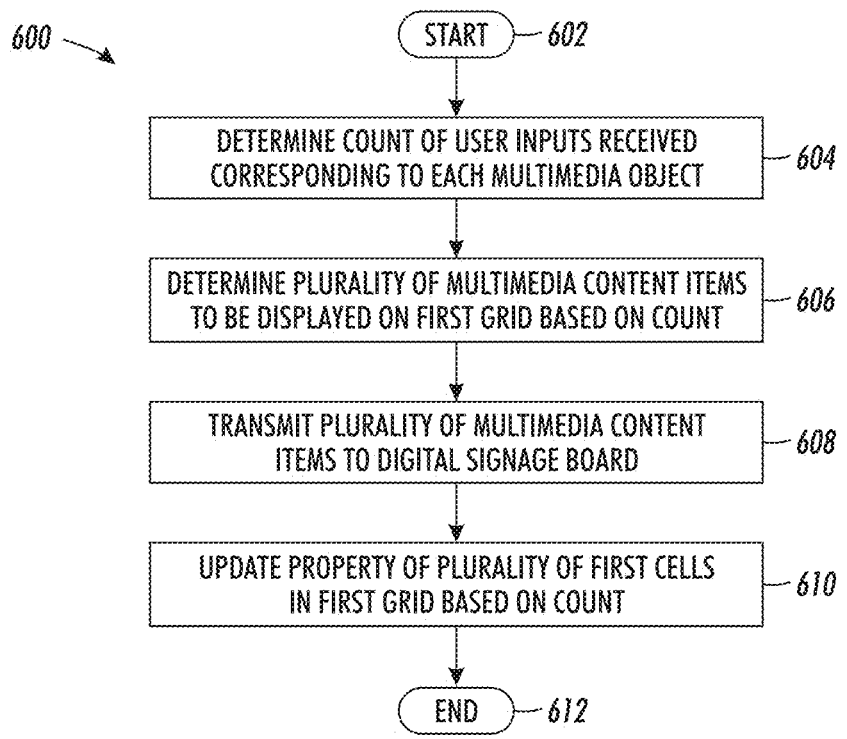
FIG. 6 is a flowchart that illustrates a second method for interaction by a server with an electronic device, in accordance with at least one embodiment.

FIG. 6 is a flowchart illustrating a second method for interaction by the server 106 with the electronic device 102, in accordance with at least one embodiment. With respect to FIG. 6, there is shown a first flowchart 600 that has been described in conjunction with FIGS. 1-3. The flowchart begins at step 602 and proceeds to step 604.

At step 604, the server 106 may be configured to determine a count of user inputs received corresponding to each multimedia object. At step 606, the server 106 may be configured to determine the plurality of multimedia content items to be displayed on the first grid based on the count. At step 608, the server 106 may be configured to transmit the plurality of multimedia content items to the digital signage board. At step 610, the server 106 may be configured to update property of the plurality of first cells in the first grid based on the count. Control passes to end step 612.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to receive a first metadata associated with a first grid displayed on the digital signage board. In an embodiment, the digital signage board may be configured to display a plurality of multimedia content items in a plurality of first cells of the first grid. A second metadata associated with the plurality of multimedia content items displayed in the plurality of first cells of the first grid, may be received by the receiver. A second grid including a plurality of second cells on the electronic device may be displayed. In an embodiment, the second grid may be displayed based on the first metadata and the second metadata. A property associated with at least one of the plurality of second cells based on a user profile stored in the electronic device and the second metadata, may be updated.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer, in an application server, to determine a count of a user inputs received corresponding to each multimedia object of a plurality of multimedia objects displayed on the second grid of the electronic device. A plurality of multimedia content items to be displayed on a first grid, being displayed on the digital signage board based on the determined count of the user inputs, may be determined. The determined plurality of multimedia content items to be displayed on the first grid after a predetermined interval, may be transmitted to a receiver.

Various embodiments of the disclosure encompass numerous advantages including methods and systems for interaction with a digital signage board and one or more electronic devices. Through various embodiments of the disclosure, it is disclosed that a user may interact with a digital signage board without using touch based inputs on the digital signage board. This is possible by use of an application, that may run on a portable electronic device associated with the user, that may fetch the relevant information displayed on the digital signage board, from a sever. Further, it is disclosed that there is no restriction vis-à-vis the number of users that may be communicatively coupled with a digital signage board, or the identity of the user. It is further disclosed that the server may be configured to analyze an impact of an advertisement displayed on the digital signage board based on the number of user inputs received corresponding to the advertisement. It is further disclosed that based on the analysis, the server may assign a timeslot to an advertisement associated with a product to maximize the impact of the advertisement. It is further disclosed that the server may change the property associated with the one or more advertisements displayed to a user on the electronic device based on the profile of the user. It is further disclosed that the server may provide an option to the one or more users to retrieve more details about a selected product based on one or more user inputs provided on the grid displayed on the electronic device of the user.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it may be intended that the present disclosure not be limited to the particular embodiment disclosed, but that the present disclosure will include all embodiments falling within the scope of the appended claims.

What is claimed is:

1. A method of coordinating a a first display screen with a second display screen, the method comprising:
   in a mobile electronic device comprising the second display screen, the mobile electronic device configured for communication with a digital signage board comprising the first display screen and a server through a communication network when the mobile electronic device is within a predefined vicinity of the digital signage board:
      receiving from the server, by a transceiver, a first metadata associated with a first grid displayed on the first display screen, wherein the digital signage board is configured to display a plurality of multimedia content items in a plurality of first cells of the first grid, and each first cell of the plurality of first cells is associated with a first index;
      receiving from the server, by the transceiver, a second metadata associated with the plurality of multimedia content items displayed in the plurality of first cells of the first grid, wherein the second metadata comprises a plurality of multimedia objects corresponding to the plurality of multimedia content items;
      displaying on the second display screen, by one or more processors, a second grid comprising a plurality of second cells, wherein the second grid is representative of the first grid, each second cell of the plurality of first cells is associated with a second index, and the second grid is displayed based on the first metadata and the second metadata;

updating, by the one or more processors, a property associated with at least one of the plurality of second cells based on a user profile stored in the electronic device and the second metadata;

displaying, by the one or more processors, the plurality of multimedia objects in the second grid, wherein each multimedia object of the plurality of multimedia objects is displayed in a second cell of the plurality of second cells; and updating, by the one or more processors, the plurality of multimedia objects being displayed in the plurality of second cells based on changes in the display of the plurality of multimedia content items in the plurality of first cells.

2. The method according to claim 1, wherein a multimedia object of the plurality of multimedia objects, displayed in the second cell, corresponds to a multimedia content item of the plurality of multimedia content items, displayed in a first cell of the plurality of first cells.

3. The method according to claim 2, wherein the second index is the same as the first index.

4. The method according to claim 1, wherein the first metadata comprises a set of rules associated with each multimedia object of the plurality of multimedia objects, wherein the set of rules is deterministic of user's interest in each multimedia object of the plurality of multimedia objects.

5. The method according to claim 4, further comprising identifying, by the one or more processors, one or more multimedia objects from the plurality of multimedia objects based on the set of rules associated with each multimedia object of the plurality of multimedia objects and the user profile.

6. The method according to claim 1, further comprising displaying on the second display screen, by the one or more processors, a list of a plurality of digital signage boards within a predefined proximity.

7. The method according to claim 6, further comprising receiving, by the transceiver, a request to select the digital signage board from the list of the plurality of digital signage boards.

8. The method according to claim 1, further comprising transmitting, by the transceiver, a request to the server, wherein the request comprises an identification of the mobile electronic device and an identification of the digital signage board.

9. The method according to claim 1, further comprising receiving, by the transceiver, a request to select a second cell from the plurality of second cells in the second grid.

10. The method according to claim 9, further comprising receiving from the server, by the transceiver, a multimedia content item corresponding to the selected second cell, wherein the received multimedia content item is displayed on the second display screen in a second cell of the plurality of second cells in the second grid, and wherein an index of the first cell in the first grid is same as an index of the second cell in the second grid.

11. The method according to claim 1, wherein updating the property of at least one of the plurality of second cells comprises highlighting the at least one of the plurality of second cells or modifying a size of the at least one of the plurality of second cells or modifying a shape of the at least one of the plurality of second cells.

12. The method of claim 1, wherein the first metadata comprises a count of rows and a count of columns of the first grid.

13. The method of claim 12, wherein the second grid is displayed based on the count of rows and the count of columns of the first grid.

14. The method according to claim 1, wherein a first user interface on the second display screen comprises the second grid, the method further comprising:

displaying a second user interface on the second display screen, the second user interface comprising product information corresponding to a product selected in a second cell of the second grid, wherein the product information comprises an option to add the product to a virtual shopping cart; or displaying a third user interface on the second display screen, the third user interface comprising the virtual shopping cart showing the selected product; or displaying both the second and third user interfaces.

15. A method of coordinating a first display screen with a second display screen, the method comprising:

in an application server:

determining, by one or more processors, a count of user inputs, received from a mobile electronic device comprising the second display screen, corresponding to each multimedia object of a plurality of multimedia objects displayed on a second grid on the second display screen;

determining, by the one or more processors, a plurality of multimedia content items to be displayed on a first grid being displayed on the first display screen of a digital signage board based on the determined count of the user inputs;

updating, by the one or more processors, a property of a plurality of first cells in the first grid based on the determined count;

transmitting to the digital signage board, by the one or more processors, the determined plurality of multimedia content items to be displayed on the first grid after a predetermined interval; and in the digital signage board:

displaying on the first display screen the determined plurality of multimedia content items, wherein the displayed determined plurality of multimedia content items reflects the updated property.

16. A digital signage system configured to coordinate a first display screen with a second display screen, the system comprising:

a digital signage board comprising the first display screen;

a server; and a mobile electronic device configured for interaction through a communication network with the server and the digital signage board when the mobile electronic device is within a predefined vicinity of the digital signage board, the mobile electronic device comprising:

the second display screen; and one or more processors configured to:

receive from the server a first metadata associated with a first grid displayed on the first display screen, wherein the digital signage board is configured to display a plurality of multimedia content items in a plurality of first cells of the first grid, and each first cell of the plurality of first cells is associated with a first index;

receive from the server a second metadata associated with the plurality of multimedia content items displayed in the plurality of first cells of the first grid, wherein the second metadata comprises a plurality of multimedia objects corresponding to the plurality of multimedia content items;

display on the second display screen a second grid comprising a plurality of second cells, based on the first metadata and the second metadata, wherein the second grid is representative of the first grid, and each second cell of the plurality of first cells is associated with a second index;

update a property associated with at least one of the plurality of second cells based on a user profile stored in the mobile electronic device and the second metadata;

display the plurality of multimedia objects in the second grid, wherein each multimedia object of the plurality of multimedia objects is displayed in a second cell of the plurality of second cells; and update the plurality of multimedia objects being displayed in the plurality of second cells based on changes in the display of the plurality of multimedia content items in the plurality of first cells.

17. The system according to claim 16, wherein a multimedia object of the plurality of multimedia objects, displayed in the second cell, corresponds to a multimedia content item of the plurality of multimedia content items, displayed in a first cell of the plurality of first cells.

18. The system according to claim 17, wherein an index of the second cell in the second grid is same as an index of the first cell in the first grid.

19. The system according to claim 16, wherein the first metadata comprises a set of rules associated with each multimedia object of the plurality of multimedia objects, wherein the set of rules is deterministic of user's interest in each multimedia object of the plurality of multimedia objects.

20. The system according to claim 19, wherein the one or more processors are further configured to identify one or more multimedia objects from the plurality of multimedia objects based on the set of rules associated with each multimedia object of the plurality of multimedia objects and the user profile.

21. The system according to claim 16, wherein the one or more processors are further configured to display on the second display screen a list of a plurality of digital signage boards within a predefined proximity.

22. The system according to claim 21, wherein the one or more processors are further configured to receive a request to select the digital signage board from the list of the plurality of digital signage boards.

23. The system according to claim 16, wherein the one or more processors are further configured to transmit a request to the server, wherein the request comprises an identification of the mobile electronic device and an identification of the digital signage board.

24. The system according to claim 16, wherein the one or more processors are further configured to receive a request to select a second cell from the plurality of second cells in the second grid.

25. The system according to claim 24, wherein the one or more processors are further configured to receive a multimedia content item corresponding to the selected second cell, wherein the received multimedia content is displayed in the second cell of the plurality of second cells in the second grid, and wherein the first index is the same as the second index.

26. The system according to claim 16, wherein updating the property of at least one of the plurality of second cells comprises highlighting the at least one of the plurality of second cells or modifying a size of the at least one of the plurality of second cells or modifying a shape of the at least one of the plurality of second cells.

27. The system according to claim 16, wherein the first metadata comprises a count of rows and a count of columns, of the first grid.

28. The system according to claim 27, wherein the second grid is displayed based on the count of rows and the count of columns, of the first grid.

29. The system of claim 16, wherein a first user interface on the second display screen comprises the second grid, the one or more processors further configured to:
- display a second user interface on the second display screen, the second user interface comprising product information corresponding to a product selected in a second cell of the second grid, wherein the product information comprises an option to add the product to a virtual shopping cart; or
- display a third user interface on the second display screen, the third user interface comprising the virtual shopping cart showing the selected product; or
- display both the second and third user interfaces.

30. A digital signage system configured to coordinate a first display screen with a second display screen, the system comprising:
- a digital signage board comprising the first display screen configured to display a determined plurality of multimedia content items; and
- an application server comprising one or more processors configured to:
  - determine a count of user inputs received from a mobile electronic device comprising the second display screen, corresponding to each multimedia object of a plurality of multimedia objects displayed on a second grid on the second display screen;
  - determine the plurality of multimedia content items to be displayed on a first grid being displayed on the first display screen of a digital signage board based on the determined count of the user inputs;
  - update, by the one or more processors, a property of a plurality of first cells in the first grid based on the determined count;
  - transmit to the digital signage board the determined plurality of multimedia content items to be displayed on the first grid reflecting the updated property after a predetermined interval.

* * * * *